US012615244B2

(12) United States Patent
Pasumarthi et al.

(10) Patent No.: US 12,615,244 B2
(45) Date of Patent: Apr. 28, 2026

(54) SYSTEMS AND METHODS FOR AUTHENTICATING DIGITAL IDS USING DUAL AUTHENTICATION IN A DISTRIBUTED NETWORK

(71) Applicant: BANK OF AMERICA CORPORATION, Charlotte, NC (US)

(72) Inventors: Kalyan V. Pasumarthi, Frisco, TX (US); Muniraju Madhuranahosahalli Jayaramaiah, Bothell, WA (US); Usha Pasumarthi, Frisco, TX (US); Sathya Sindhu Varadarajan, Bothell, WA (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 53 days.

(21) Appl. No.: 18/663,706

(22) Filed: May 14, 2024

(65) Prior Publication Data

US 2025/0358268 A1 Nov. 20, 2025

(51) Int. Cl.
*H04L 9/40* (2022.01)

(52) U.S. Cl.
CPC .................................... *H04L 63/08* (2013.01)

(58) Field of Classification Search
CPC .... H04L 63/08; H04L 63/18; H04L 2463/082
See application file for complete search history.

(56) References Cited

U.S. PATENT DOCUMENTS

| | | | | |
|---|---|---|---|---|
| 11,750,587 B1 * | 9/2023 | Voutour | .................. | H04L 63/10 |
| | | | | 726/3 |
| 2005/0076246 A1 * | 4/2005 | Singhal | .................... | H04L 63/02 |
| | | | | 713/160 |
| 2007/0233615 A1 * | 10/2007 | Tumminaro | ............ | H04L 63/08 |
| | | | | 705/75 |
| 2016/0048846 A1 * | 2/2016 | Douglas | .................. | G06F 16/23 |
| | | | | 705/318 |
| 2018/0376277 A1 * | 12/2018 | Dudhmahl | ............ | H04W 12/06 |
| 2019/0188411 A1 * | 6/2019 | Kroutik | .................. | H04L 9/3297 |
| 2019/0281158 A1 * | 9/2019 | Gupta | ..................... | H04L 63/08 |
| 2020/0007493 A1 * | 1/2020 | Nair | ......................... | H04L 63/08 |
| 2020/0280451 A1 * | 9/2020 | Kinney | ................. | H04L 9/3297 |
| 2020/0389456 A1 * | 12/2020 | Laucius | .................. | G06F 21/41 |
| 2021/0328988 A1 * | 10/2021 | Hall | ........................ | G06F 21/31 |
| 2023/0231848 A1 * | 7/2023 | On | ........................... | H04L 63/08 |
| | | | | 705/71 |

* cited by examiner

*Primary Examiner* — Javier O Guzman
(74) *Attorney, Agent, or Firm* — Moore & Van Allen PLLC; Lauren M. Stokes

(57) ABSTRACT

Systems, computer program products, and methods are described herein for authenticating digital IDs over an electronic network using dual authentication in a distributed network. The present disclosure is configured to identify a primary communication channel from a user device; generate an authentication prompt for the primary communication channel; transmit the authentication prompt to the user device; identify, based on the authentication prompt, an authentication credential from a secondary communication channel associated with the user device; and authenticate the authentication credential based on a digital identifier associated with the user device.

14 Claims, 5 Drawing Sheets

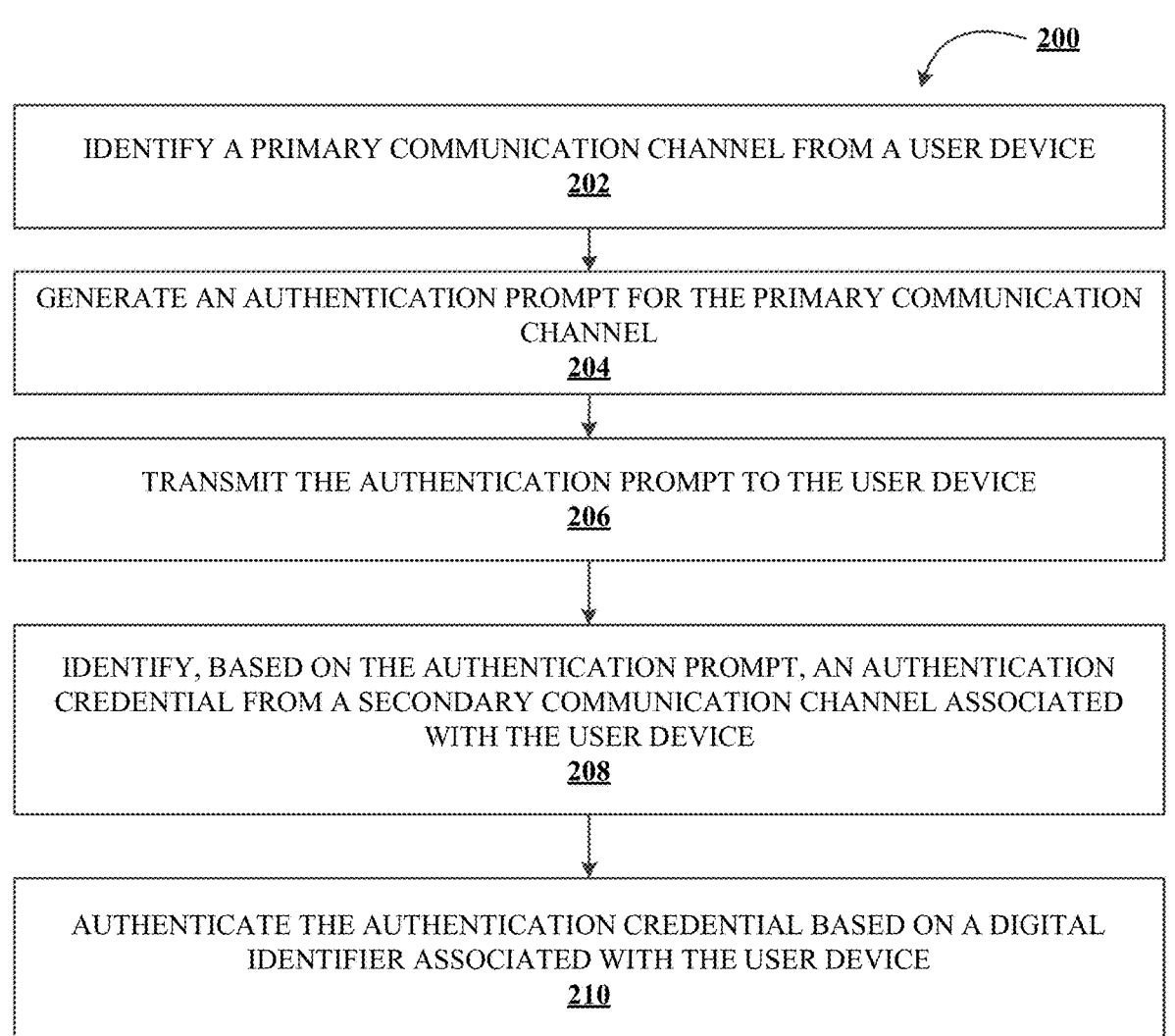

200

IDENTIFY A PRIMARY COMMUNICATION CHANNEL FROM A USER DEVICE
202

GENERATE AN AUTHENTICATION PROMPT FOR THE PRIMARY COMMUNICATION
CHANNEL
204

TRANSMIT THE AUTHENTICATION PROMPT TO THE USER DEVICE
206

IDENTIFY, BASED ON THE AUTHENTICATION PROMPT, AN AUTHENTICATION
CREDENTIAL FROM A SECONDARY COMMUNICATION CHANNEL ASSOCIATED
WITH THE USER DEVICE
208

AUTHENTICATE THE AUTHENTICATION CREDENTIAL BASED ON A DIGITAL
IDENTIFIER ASSOCIATED WITH THE USER DEVICE
210

FIGURE 2

SYSTEMS AND METHODS FOR AUTHENTICATING DIGITAL IDS USING DUAL AUTHENTICATION IN A DISTRIBUTED NETWORK

TECHNOLOGICAL FIELD

Example embodiments of the present disclosure relate to authenticating digital IDs over an electronic network using dual authentication in a distributed network.

BACKGROUND

Many issues arise when trying to authenticate a user and/or their user device remotely and over a network, especially when typical authentication methods are unable to connect to the user's device due to downtime in network capabilities, user device capabilities (e.g., those user devices that are unable to use current methods such as digital ID), and/or the like. Thus, there exists a need for a system or method that can automatically, efficiently, and securely authenticate a user device and an associated user over a network using digital IDs and dual authentication methods like those described hereinbelow.

Applicant has identified a number of deficiencies and problems associated with authenticating digital IDS in a distributed network. Through applied effort, ingenuity, and innovation, many of these identified problems have been solved by developing solutions that are included in embodiments of the present disclosure, many examples of which are described in detail herein.

BRIEF SUMMARY

Systems, methods, and computer program products are provided for authenticating digital IDs over an electronic network using dual authentication in a distributed network.

In one aspect, a system for authenticating digital IDs over an electronic network using dual authentication in a distributed network is provided. In some embodiments, the system may comprise: a processing device; a non-transitory storage device containing instructions when executed by the processing device, causes the processing device to perform the steps of: identify a primary communication channel from a user device; generate an authentication prompt for the primary communication channel; transmit the authentication prompt to the user device; identify, based on the authentication prompt, an authentication credential from a secondary communication channel associated with the user device; and authenticate the authentication credential based on a digital identifier associated with the user device.

In some embodiments, the primary communication channel from the user device is received by an interactive voice response (IVR) system.

In some embodiments, the authentication prompt is associated with an authentication prompt threshold and wherein the authentication credential is associated with an authentication response timestamp. In some embodiments, the authentication response timestamp is compared to the authentication prompt threshold, and in an instance where the authentication response timestamp exceeds the authentication prompt threshold, disallow access of the primary communication channel and the secondary communication channel for the user device. In some embodiments, the authentication response timestamp meets or is less than the authentication prompt threshold, allow access of the primary communication channel and the secondary communication channel for the user device.

In some embodiments, the secondary communication channel is associated with an application associated with an entity of the primary communication channel.

In some embodiments, the secondary communication channel is generated on a secondary user device. In some embodiments, the secondary user device comprises a party identifier shared with the user device.

In some embodiments, the authentication prompt is automatically generated by an interactive voice response (IVR) system.

In some embodiments, the authentication prompt comprises an authentication credential instruction at the secondary communication channel.

In some embodiments, the primary communication channel and the secondary communication channel are authenticated based on the digital identifier, in response to the authentication of the authentication credential.

Similarly, and as a person of skill in the art will understand, each of the features, functions, and advantages provided herein with respect to the system disclosed hereinabove may additionally be provided with respect to a computer-implemented method and computer program product. Such embodiments are provided for exemplary purposes below and are not intended to be limited.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
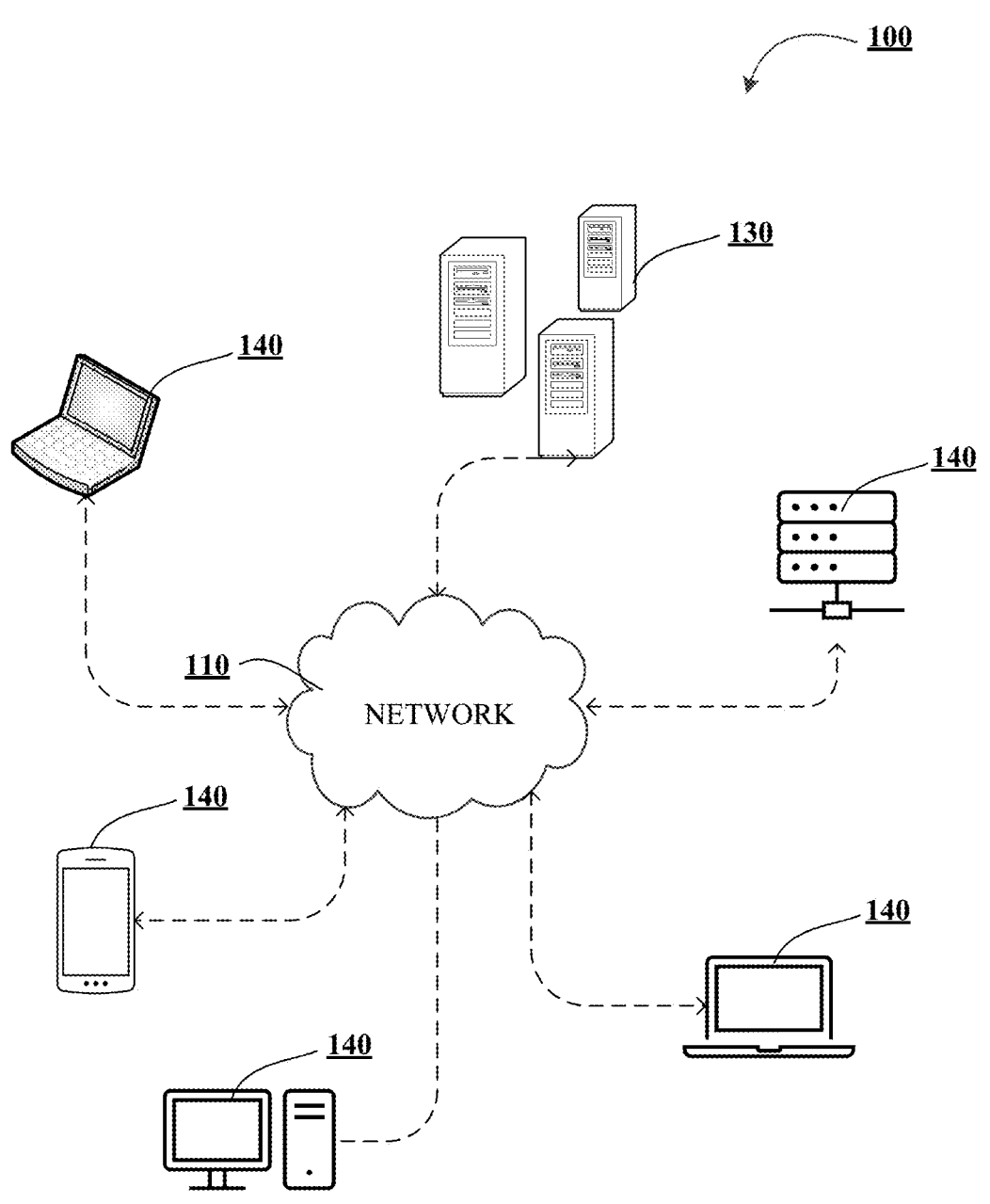
Figure 1B:
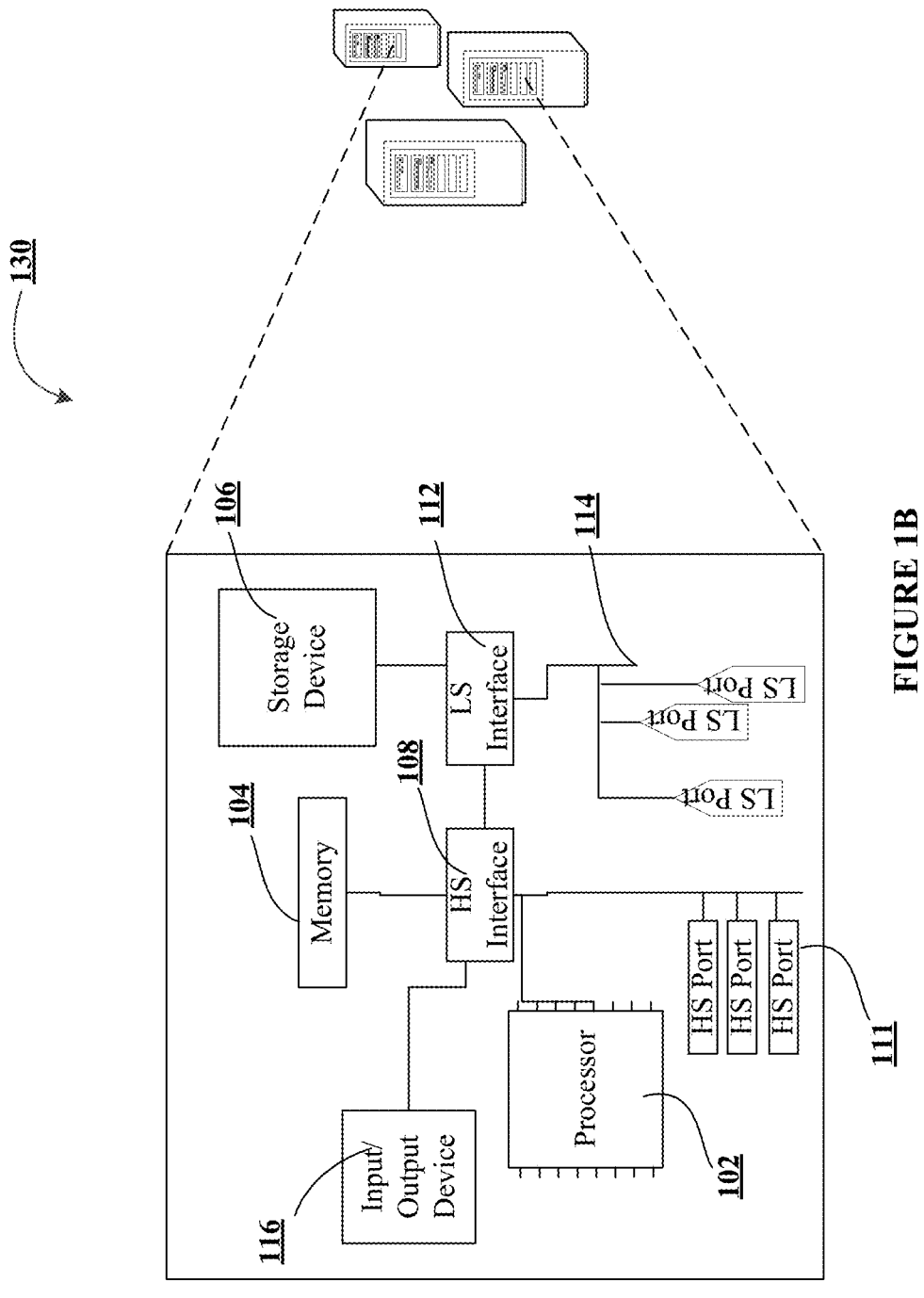
Figure 1C:
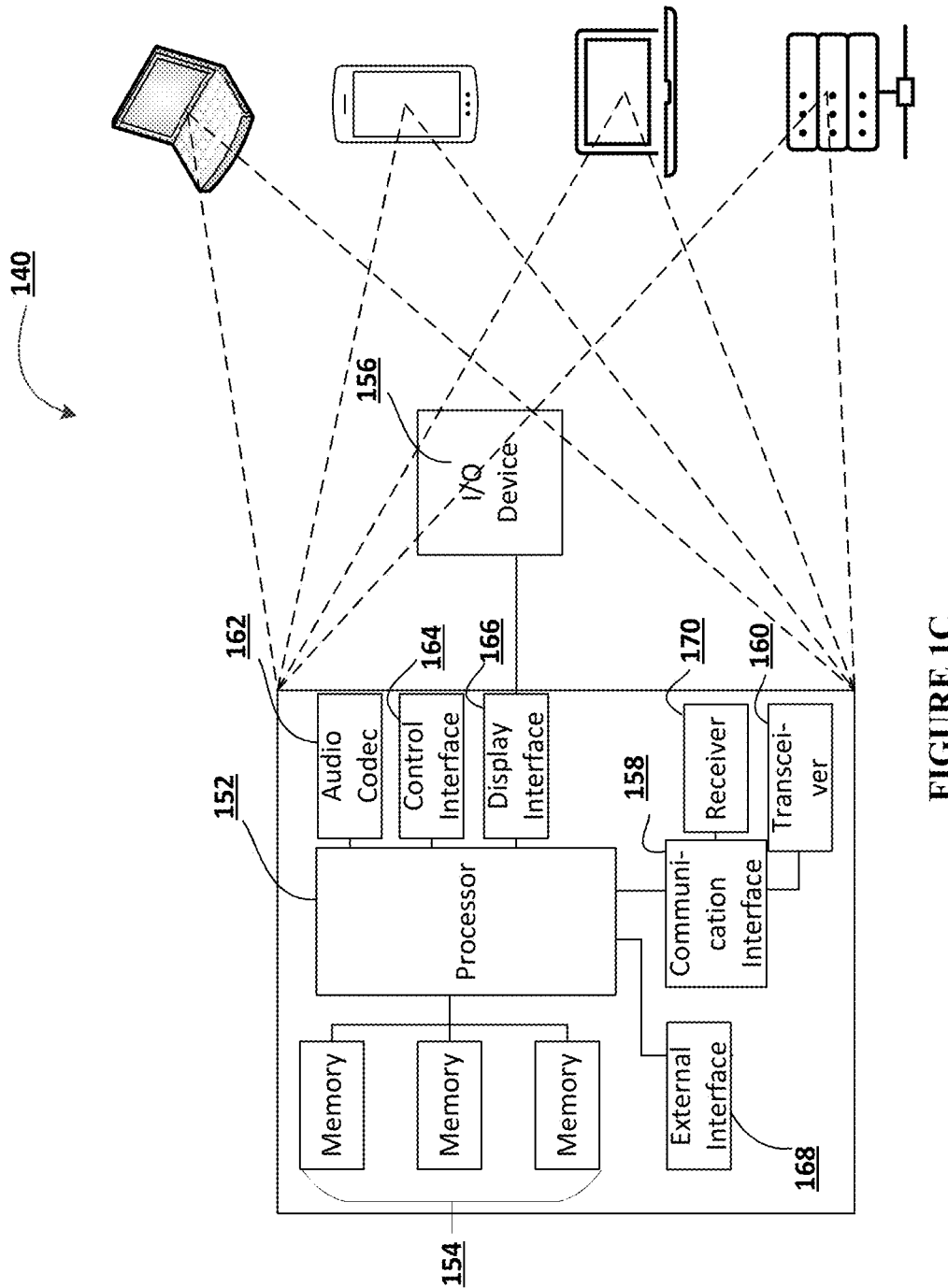
Figure 3:
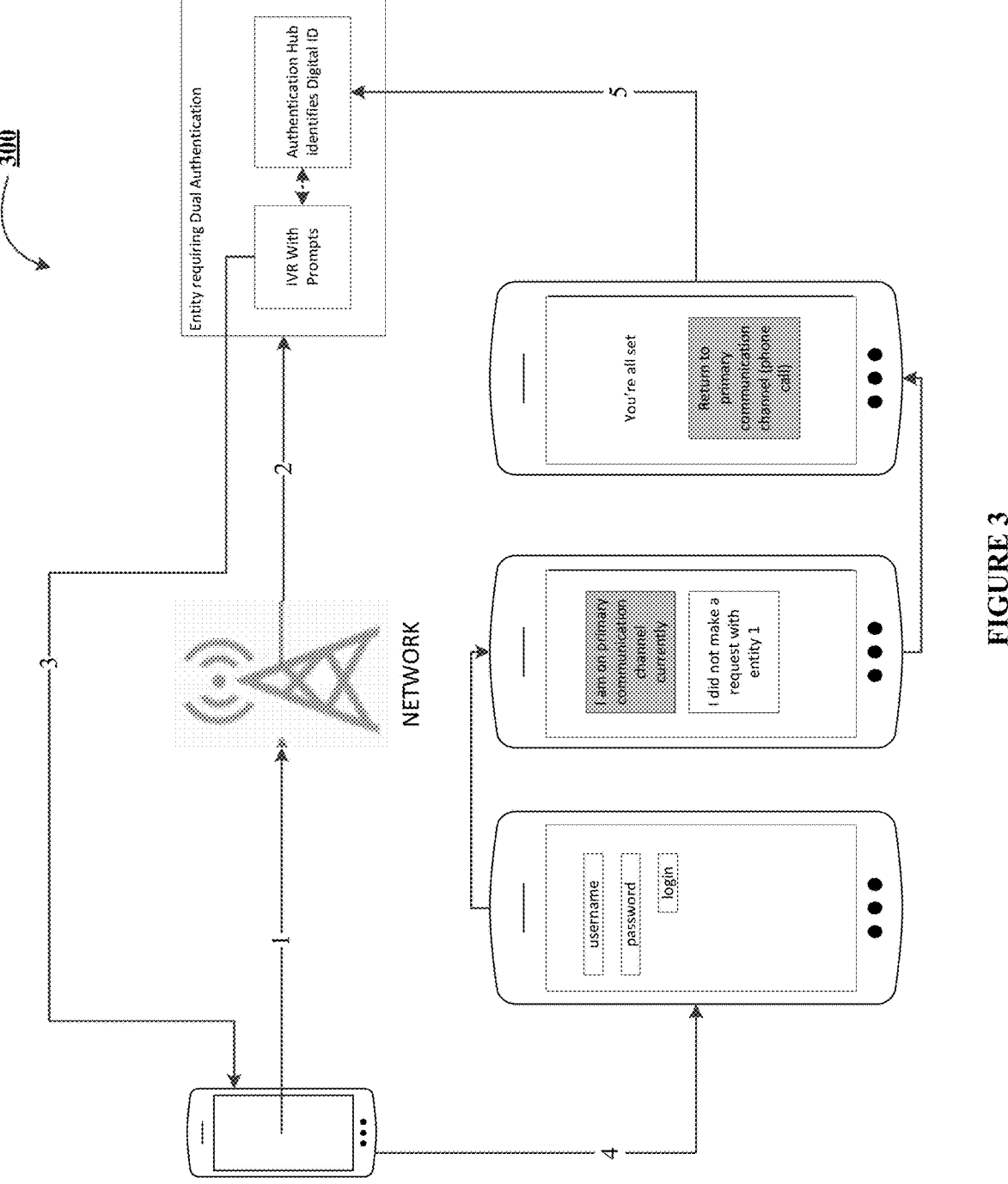

FIGS. 1A-1C illustrates technical components of an exemplary distributed computing environment for authenticating digital IDs over an electronic network using dual authentication in a distributed network, in accordance with an embodiment of the disclosure;

FIG. 2 illustrates a process flow for authenticating digital IDs over an electronic network using dual authentication in a distributed network, in accordance with an embodiment of the disclosure; and FIG. 3 illustrates exemplary technical components in a flow diagram for authenticating digital IDs over an electronic network using dual authentication in a distributed network, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, a "resource" may generally refer to objects, products, devices, goods, commodities, services, and the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, or the like. For purposes of this disclosure, a resource is typically stored in a resource repository-a storage location where one or more resources are organized, stored and retrieved electronically using a computing device.

As used herein, a "resource transfer," "resource distribution," or "resource allocation" may refer to any transaction, activities or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e., paper check processing) or through electronic transaction processing systems. Typical financial transactions include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points etc. When discussing that resource transfers or transactions are evaluated, it could mean that the transaction has already occurred, is in the process of occurring or being processed, or that the transaction has yet to be processed/posted by one or more financial institutions. In some embodiments, a resource transfer or transaction may refer to non-financial activities of the user. In this regard, the transaction may be a customer account event, such as but not limited to the customer changing a password, ordering new checks, adding new accounts, opening new accounts, adding or modifying account parameters/restrictions, modifying a payee list associated with one or more accounts, setting up automatic payments, performing/modifying authentication procedures and/or credentials, and the like.

Many issues arise when trying to authenticate a user and/or their user device remotely and over a network, especially when typical authentication methods are unable to connect to the user's device due to downtime in network capabilities, user device capabilities (e.g., those user devices that are unable to use current methods such as digital ID), and/or the like. For instance, and where an authenticating entity transmits or sends push notifications or SMS text messages with authentication methods described for the user to follow, there often exists the problem where the user's device is not capable of receiving the SMS messages or push notifications, and/or are not capable of completing the steps for authentication due to their device's technical obsolescence (such as those user devices that are unable to use digital IDs or are unable to access computer applications). Thus, there exists a need for a system or method that can automatically, efficiently, and securely authenticate a user device and an associated user over a network using digital IDs and dual authentication methods like those described hereinbelow.

Thus, and as described herein, the disclosure provides a system, method, or computer program product for authenticating a user's digital ID by using an application (such an application associated with a recipient entity of a first communication, such as a financial institution) for dual authentication. For instance, the system may identify a first or primary communication, such as over an interactive voice response (IVR) to interact with a user and receive information regarding the user and their purpose for the primary communication, and based on the primary communication data, may transmit a request for a secondary authentication within another application for the user. For example, the system may transmit a request for the user to authenticate their digital ID by logging into an application or website associated with their digital ID, rather than requesting the user respond to a push notification or SMS notification (which can be unreliable and technologically challenging for some user devices). Thus, the disclosure provided herein provides a mechanism for dually authenticating the user and the user device of the primary communication, which allows for authenticating the user and user device in those instances where the user device is capable of performing device ID and those user devices that are incapable of performing device ID, without the need for push notifications or text messages which can be interrupted or never reach the intended user device.

Accordingly, the present disclosure provides for the identification of a primary communication channel from a user device; a generation of an authentication prompt for the primary communication channel; a transmission of the authentication prompt to the user device; an identification, based on the authentication prompt, of an authentication credential from a secondary communication channel associated with the user device; and an authentication of the authentication credential based on a device identifier associated with the user device.

What is more, the present disclosure provides a technical solution to a technical problem. As described herein, the technical problem includes the dual authentication of a user and their user device over a network. The technical solution presented herein allows for dually authenticating the user device(s) and the user over separate communication channels. In particular, the disclosure provided herein is an improvement over existing solutions to the authenticating of user devices and users remotely, (i) with fewer steps to achieve the solution, thus reducing the amount of computing resources, such as processing resources, storage resources, network resources, and/or the like, that are being used (e.g., based on the disclosure provided herein, the authentication methods may be shared among different communication channels, which allows both communication channels to continue working without unduly burdening either); (ii) providing a more accurate solution to problem, thus reducing the number of resources required to remedy any errors made due to a less accurate solution; (iii) removing manual input and waste from the implementation of the solution, thus improving speed and efficiency of the process and conserving computing resources (e.g., by allowing for dual authentication using two communication channels and by getting rid of the requirement for push notifications or SMS messages to be transmitted to the user device, we eliminate potential man in the middle attacks, eliminate potential interruptions or message failures to the user device, while maintaining security of the data transmitted between the user device and the recipient entity); (iv) determining an optimal amount of resources that need to be used to implement the solution, thus reducing network traffic and load on existing computing resources (e.g., by using separate communication channels, the primary communication channel may be lessened of its burden of performing the dual authentication itself). Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for authenticating digital IDs over an electronic network using dual authentication in a distributed network 100, in accordance with an embodiment of the invention. As shown in FIG. 1A, the distributed computing environment 100 contemplated herein may include a system 130 (i.e., like the system described herein), an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 106. The system 130 may also include a high-speed interface 108 connecting to the memory 104, and a low-speed interface 112 (shown as "LS Interface") connecting to low speed bus 114 (shown as "LS Port") and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 (shown as "HS Interface") is coupled to memory 104, input/output (I/O) device 116 (e.g., through a graphics processor or accelerator), and to high-speed expansion ports 111 (shown as "HS Port"), which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the invention. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert it to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process flow 200 for authenticating digital IDs over an electronic network using dual authentication in a distributed network, in accordance with an embodiment of the disclosure. In some embodiments, a system (e.g., similar to one or more of the systems described herein with respect to FIGS. 1A-1C and 2) may perform one or more of the steps of process flow 200. For example, a system (e.g., the system 130 described herein with respect to FIG. 1A-1C) may perform the steps of process flow 200.

As shown in block 202, the process flow 200 may include the step of identifying a primary communication channel from a user device. As used herein, the primary communication channel refers to an initial communication channel between the user device and a receiving entity's network or system, such as a receiving entity's data center, call center, branch, and/or the like, which is configured to receive the primary communication channel and interact with the data of the primary communication channel.

For instance, and in some embodiments, a communication channel may comprise a phone call, a text message, instant messaging, electronic mail (e-mail) communication, application messaging, and/or the like. By way of non-limiting example, the primary communication channel may comprise an initial phone call to an entity's call center, such as a financial institution's call center. In some embodiments, the primary communication channel may comprise at least one initial message (e.g., a voice message, a voice request, and/or the like) and the rest of the messages captured in the session with the initial message. For example, and upon calling an entity's call center, the primary communication channel may comprise an initial vocal request by a user to the entity's call center, which may request technical help with a particular user account, resource account, and/or the like on the user's device. In some embodiments, the primary communication channel from the user device may received by an interactive voice response (IVR) system, which may be configured to college the requests and/or responses from the user based on the IVR's automated questionnaire. Thus, and based on the receipt of the primary communication channel at the recipient entity's system, the system may identify the initial message of the primary communication channel and may start recording the session of the primary communication channel (and any other additional communication channels identified for the user and/or the user device, such as the secondary communication channel described in more detail below).

As shown in block 204, the process flow 200 may include the step of generating an authentication prompt for the primary communication channel. For example, the system may generate an authentication prompt for the primary communication channel, such as an authentication prompt which requests a submission of an authentication credential(s) on the user's device over a secondary communication channel. For example, and in some embodiments, the authentication prompt may comprise an authentication credential instruction at the secondary communication channel.

By way of non-limiting example, and in some embodiments, the system may generate the authentication prompt as a vocal prompt (such as by the IVR system) which may request a secondary authentication by a user to authenticate themselves and/or their device as trustworthy. Thus, and in other words, the authentication prompt may be automatically generated by an interactive voice response (IVR) system. Therefore, and as the primary communication channel interacts with and communicates with the IVR system, the IVR system may collect the responses transmitted over the primary communication channel, parse the responses, and determine the task the user of the primary communication channel needs help with and/or needs assistance with. However, and in order to provide such help or assistance, the user of the primary communication channel must be authenticated (such as via digital ID and/or authentication credentials).

As shown in block 206, the process flow 200 may include the step of transmitting the authentication prompt to the user device. For example, the system may transmit the authentication prompt to the user device via the primary communication channel (e.g., by stating the authentication prompt as a vocal response by the IVR system). In some such embodiments, the authentication prompt may comprise a vocal request for the user of the user device to input their authentication credential(s) (such as a user ID and password) into an application associated with the recipient entity (such as a financial institution's application which is configured to receive authentication credentials via a fillable graphical user interface component(s), which is shown and described in more detail below with respect to FIG. 3). In some embodiments, and where the primary communication channel comprises an instant messaging with the user device, then the authentication prompt may comprise the same type of communication as the primary communication channel (e.g., where the primary communication channel comprises text messages, the authentication prompt may be formatted and transmitted as a text message; where the primary communication channel is an electronic mail message, the authentication prompt may be formatted and transmitted as an electronic mail message, where the primary communication channel is an instant message over an application, the authentication prompt may be formatted and transmitted as an instant message over the same application; and/or the like).

As shown in block 208, the process flow 200 may include the step of identifying, based on the authentication prompt, an authentication credential from a secondary communication channel associated with the user device. For instance, the system may identify and/or receive an authentication credential from a secondary communication channel, whereby the authentication credential is determined to be based on the authentication prompt generated and transmitted to the user device. In this manner, the authentication credential received may act as a dual authentication method for authenticating the user of the user device and of the primary communication channel.

In some embodiments, the system may identify and/or receive the authentication credentials by an application associated with the recipient entity receiving the authentication credentials Thus, and in some such embodiments, the system may receive an indication that the authentication credentials have been received by the application and authenticated or verified as correct before moving on to the next step in the process flow 200. In some embodiments, the system itself may receive the authentication credentials inputted into the application and may verify the authentication credentials as correct. In some such embodiments, the authentication credentials may be verified based on pre-stored authentication credentials associated with the user account of the user of the user device. In some embodiments, the authentication credentials may be verified based on the user device itself and its identifying data (e.g., such as based on a known digital identifier (digital ID) for the user device) such that the user can be verified with the user device.

In some such embodiments, the digital ID may comprise identifying data for verifying the user, such as facial recognition software on their user device, fingerprint scanning on their user device, voice recognition, and/or the like. In this manner, the user device may act as its own verification system for the user and the system may track the user devices associated with the user account which have this capability. Thus, and in some embodiments, the system may track and record the user devices (such as based on their device identifiers which comprise a unique string of alphanumeric characters that uniquely identifies each user device) that are capable and configured for using digital IDs that are associated with the user/user's account.

In some embodiments, the secondary communication channel may be associated with an application associated with an entity of the primary communication channel. For example, and as described herein, the secondary communication channel may comprise an application interface on the user device (e.g., the same user device currently being used for the primary communication channel and/or a secondary user device that the user has access to) associated with a recipient entity of the primary communication (e.g., a financial institution application). In such embodiments, the secondary communication channel may comprise at least one fillable interface component for the user of the user device to input their authentication credential.

In some embodiments, the secondary communication channel is generated on a secondary user device. For example, and in some embodiments, the user of the user device for the primary communication channel may use a secondary user device (such as another mobile phone, a desktop computer, a laptop, a tablet, and/or the like) for completing the request of the authentication prompt.

In some embodiments, the secondary user device comprises a party identifier shared with the user device. For example, the system may track and record each of the user devices and their associated digital IDs associated with a user account and may tag each of the device identifiers which have previously been used to authenticate a user with the digital IDs for the user account with a party identifier (a unique string of alphanumeric characters which identifies all the devices used by a user for their user account). In some embodiments, and upon identifying a user device being used for the primary communication channel, then the system may identify which user devices may be used for authenticating the user (e.g., logging into an application associated with the user account for verification) and which user devices with the party identifier are capable of logging into an application (e.g., those devices that are not a landline telephone).

In some embodiments, the authentication prompt is associated with an authentication prompt threshold and wherein the authentication credential is associated with an authentication response timestamp. For example, and upon transmitting the authentication prompt to the user device, the system may record an authentication prompt threshold (e.g., a threshold time with which the user must input their authentication credentials based on the authentication prompt before the authentication prompt is no longer valid and the dual authentication can no longer be validated) for the user to input the authentication credentials/complete the step(s) of the authentication prompt. In some such embodiments, the authentication prompt threshold may be pre-defined, such as pre-defined by a manager of the system, by a client of the system (e.g., a financial institution client), and/or by the system itself (e.g., based on past instances and timestamps of authentication credentials being received). In some such embodiments, a timestamp of when the authentication response is inputted and/or receive by the system may be recorded as the authentication response timestamp, and such an authentication response timestamp may be compared against the authentication prompt threshold.

In some embodiments, the authentication response timestamp is compared to the authentication prompt threshold, and in an instance where the authentication response timestamp exceeds the authentication prompt threshold, disallow access of the primary communication channel and/or the secondary communication channel for the user device. For example, the system may automatically disallow access of the primary communication channel by ending the call with the user. Additionally, and/or alternatively, the system may disallow access of the primary communication channel for the current session by generating a new session for the user and generating a new authentication prompt (and a new authentication prompt threshold) for the user to respond with authentication credentials. In some embodiments, the system may additionally and/or alternatively disallow access to the secondary communication channel by blocking the user from logging into the application in the secondary communication channel.

In some embodiments, the authentication response timestamp meets or is less than the authentication prompt threshold, allow access of the primary communication channel and the secondary communication channel for the user device. For example, the system may determine that the authentication response timestamp does not exceed or is less than the authentication prompt threshold, and may automatically allow access of the primary communication channel (e.g., return the user to the phone call) and allow access of the secondary communication channel (e.g., allow the user to interact with the application within the user's user account). In this manner, the system may validate the user based on this dual authentication over the dual communication channels.

As shown in block 210, the process flow 200 may include the step of authenticating the authentication credential based on a digital identifier (digital ID) associated with the user device. For example, the system may authenticate or validate the authentication credential(s) based on receiving or identifying the authentication credentials from the secondary communication channel and may record the digital ID of the user device used for the secondary communication channel. Based on the digital ID's verification of the user and the authentication credentials validated by the system, the system may allow the user to continue accessing the primary communication channel and/or the secondary communication channel, while also ensuring the data of the user account is secured (e.g., via encryption technology as the data is transmitted between the user device and the recipient entity) and the user is validated via multiple methods.

FIG. 3 illustrates exemplary technical components in a flow diagram 300 for authenticating digital IDs over an electronic network using dual authentication in a distributed network, in accordance with an embodiment of the disclosure. In some embodiments, a system (e.g., similar to one or more of the systems described herein with respect to FIGS. 1A-1C and 2) may perform one or more of the steps of process flow 300. For example, a system (e.g., the system 130 described herein with respect to FIG. 1A-1C) may perform the steps of process flow 300.

As shown in flow 300, the process may begin at step 1 with a user device (such as a mobile phone) connecting to a network and the network routing the primary communication channel from the user device to an entity requiring dual authentication (at step 2), such as a financial institution receiving the primary communication channel and its associated data. In some embodiments, the entity requiring dual authentication may be configured with an IVR system which is configured to generate authentication prompts and transmit the authentication prompts back to the user device (such as that shown in step 3).

In some embodiments, and as shown in step 4, upon transmitting the authentication prompt to the user device via the primary communication channel, the user device (or a secondary user device, which is not shown), may be configured to show an application user interface (like the application user interface shown on the mobile device between steps 4 and 5). In some such embodiments, the application user interface may be configured to receive authentication credentials from a user, verify the authentication credentials, and verify that the user inputting the authentication credentials is the same user as the user on the primary communication channel. Further, and as shown in application user interface of step 4, the application user interface may further be configured to ask for an input by the user to automatically return the user interface back to the primary communication channel (e.g., "Return to primary communication channel (phone call)") and allow continued access to the primary communication channel via the verified and authenticated user device (as shown in step 5). Further, and upon transmitting the authentication credentials indication and/or the authentication credentials themselves in step 5, the system may further be configured to transmit the data of the user session to an authentication hub which identifies the digital ID and verifies the user based on the digital ID.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for authenticating Digital IDs over an electronic network using dual authentication in a distributed network, the system comprising:
   a processing device;
   a non-transitory storage device containing instructions when executed by the processing device, causes the processing device to perform the steps of:
   identify a primary communication channel from a user device, wherein the user device is associated with a device identifier comprising a string of alphanumeric characters unique to the user device, wherein the device identifier is tagged with a party identifier comprising a unique string of alphanumeric characters that identifies other user devices associated with the user device;

generate an authentication prompt for the primary communication channel;

transmit the authentication prompt to the user device;

identify, based on the authentication prompt, an authentication credential from a secondary communication channel associated with the user device, wherein the secondary communication channel is generated on a secondary user device, wherein the secondary user device is associated with a secondary device identifier comprising a string of alphanumeric characters unique to the secondary user device, wherein the secondary device identifier is tagged with the party identifier; and authenticate the authentication credential based on a digital identifier associated with the user device.

2. The system of claim 1, wherein the primary communication channel from the user device is received by an interactive voice response (IVR) system.

3. The system of claim 1, wherein the authentication prompt is associated with an authentication prompt threshold and wherein the authentication credential is associated with an authentication response timestamp.

4. The system of claim 3, wherein the authentication response timestamp is compared to the authentication prompt threshold, and in an instance where the authentication response timestamp exceeds the authentication prompt threshold, disallow access of the primary communication channel and the secondary communication channel for the user device.

5. The system of claim 3, wherein the authentication response timestamp meets or is less than the authentication prompt threshold, allow access of the primary communication channel and the secondary communication channel for the user device.

6. The system of claim 1, wherein the secondary communication channel is associated with an application associated with an entity of the primary communication channel.

7. The system of claim 1, wherein the authentication prompt is automatically generated by an interactive voice response (IVR) system.

8. The system of claim 1, wherein the authentication prompt comprises an authentication credential instruction at the secondary communication channel.

9. The system of claim 1, wherein the primary communication channel and the secondary communication channel are authenticated based on the digital identifier, in response to the authentication of the authentication credential.

10. A computer program product for authenticating Digital IDs over an electronic network using dual authentication in a distributed network, the computer program product comprising a non-transitory computer-readable medium comprising code causing an apparatus to:

identify a primary communication channel from a user device, wherein the user device is associated with a device identifier comprising a string of alphanumeric characters unique to the user device, wherein the device identifier is tagged with a party identifier comprising a unique string of alphanumeric characters that identifies other user devices associated with the user device;

generate an authentication prompt for the primary communication channel;

transmit the authentication prompt to the user device;

identify, based on the authentication prompt, an authentication credential from a secondary communication channel associated with the user device, wherein the secondary communication channel is generated on a secondary user device, wherein the secondary user device is associated with a secondary device identifier comprising a string of alphanumeric characters unique to the secondary user device, wherein the secondary device identifier is tagged with the party identifier; and authenticate the authentication credential based on a digital identifier associated with the user device.

11. The computer program product of claim 10, wherein the primary communication channel from the user device is received by an interactive voice response (IVR) system.

12. The computer program product of claim 10, wherein the authentication prompt is automatically generated by an interactive voice response (IVR) system.

13. A computer-implemented method for authenticating Digital IDs over an electronic network using dual authentication in a distributed network, the computer-implemented method comprising:

identifying a primary communication channel from a user device, wherein the user device is associated with a device identifier comprising a string of alphanumeric characters unique to the user device, wherein the device identifier is tagged with a party identifier comprising a unique string of alphanumeric characters that identifies other user devices associated with the user device;

generating an authentication prompt for the primary communication channel;

transmitting the authentication prompt to the user device;

identifying, based on the authentication prompt, an authentication credential from a secondary communication channel associated with the user device, wherein the secondary communication channel is generated on a secondary user device, wherein the secondary user device is associated with a secondary device identifier comprising a string of alphanumeric characters unique to the secondary user device, wherein the secondary device identifier is tagged with the party identifier; and authenticating the authentication credential based on a digital identifier associated with the user device.

14. The computer-implemented method of claim 13, wherein the primary communication channel from the user device is received by an interactive voice response (IVR) system.

* * * * *